(12) United States Patent
Flint et al.

(10) Patent No.: US 9,196,305 B2
(45) Date of Patent: Nov. 24, 2015

(54) SMART TRANSITIONS

(75) Inventors: Gary Flint, San Jose, CA (US); Stefan Hafeneger, Elsdorf (DE)

(73) Assignee: Apple Inc., Cupertino, CA (US)

( * ) Notice: Subject to any disclaimer, the term of this patent is extended or adjusted under 35 U.S.C. 154(b) by 602 days.

(21) Appl. No.: 13/016,907

(22) Filed: Jan. 28, 2011

(65) Prior Publication Data

US 2012/0198338 A1   Aug. 2, 2012

(51) Int. Cl.
| | | |
|---|---|---|
| G06F 3/048 | (2013.01) | |
| G11B 27/034 | (2006.01) | |
| G11B 27/038 | (2006.01) | |
| G11B 27/34 | (2006.01) | |

(52) U.S. Cl.
CPC ............ *G11B 27/034* (2013.01); *G11B 27/038* (2013.01); *G11B 27/34* (2013.01)

(58) Field of Classification Search
USPC ......................................................... 715/726
See application file for complete search history.

(56) References Cited

U.S. PATENT DOCUMENTS

| | | | | |
|---|---|---|---|---|
| 6,278,466 | B1 * | 8/2001 | Chen .............................. | 345/473 |
| 6,381,281 | B1 | 4/2002 | Higurashi | |
| 6,662,329 | B1 * | 12/2003 | Foster et al. ................... | 714/747 |
| 6,909,743 | B1 | 6/2005 | Ward et al. | |
| 6,934,423 | B1 * | 8/2005 | Clapper ......................... | 382/300 |
| 7,432,940 | B2 * | 10/2008 | Brook et al. ................... | 345/629 |
| 2002/0109787 | A1 | 8/2002 | Moni et al. | |
| 2004/0139462 | A1 * | 7/2004 | Hannuksela et al. ........... | 725/32 |
| 2004/0177317 | A1 * | 9/2004 | Bradstreet .................. | 715/500.1 |
| 2005/0180733 | A1 | 8/2005 | Yatomi | |
| 2005/0182503 | A1 | 8/2005 | Lin et al. | |
| 2005/0231511 | A1 | 10/2005 | Doepke et al. | |
| 2006/0078218 | A1 | 4/2006 | Igarashi | |
| 2006/0132482 | A1 * | 6/2006 | Oh ................................ | 345/419 |
| 2006/0143667 | A1 * | 6/2006 | Kurosawa ....................... | 725/89 |
| 2006/0197843 | A1 | 9/2006 | Yoshimatsu | |
| 2007/0074115 | A1 * | 3/2007 | Patten et al. .................. | 715/716 |
| 2007/0162855 | A1 | 7/2007 | Hawk et al. | |
| 2008/0024665 | A1 | 1/2008 | Nakoji | |
| 2008/0181494 | A1 | 7/2008 | Watanabe et al. | |
| 2009/0048939 | A1 | 2/2009 | William | |
| 2009/0282336 | A1 | 11/2009 | Lindley et al. | |
| 2012/0010882 | A1 | 1/2012 | Thyssen et al. | |
| 2012/0195573 | A1 | 8/2012 | Flint et al. | |

OTHER PUBLICATIONS iMovie '09 & iDVD: The Missing Manual, David Pogue et. al., Apr. 21, 2009, p. 121.*

(Continued)

*Primary Examiner* — Matthew Ell
(74) *Attorney, Agent, or Firm* — Schwegman Lundberg & Woessner, P.A.

(57) ABSTRACT

A method, system and computer-readable storage medium for performing smart transitions between video clips are disclosed. According to implementations, a first video clip can be displayed on an interface of a video editing application. A second video clip can be received in the interface. In response to receiving the second video clip, a video clip sequence that includes the first video clip, the second video clip and a transition selected based on content characteristics of the first video clip and the second video clip can be generated. The generated video clip sequence containing the transition can be displayed on the interface. The video clip sequence including the transition can be generated automatically in response to receiving the second video clip.

29 Claims, 11 Drawing Sheets (56) References Cited

OTHER PUBLICATIONS

"U.S. Appl. No. 13/016,928, Appeal Brief filed Sep. 25, 2014", 29 pgs.
"U.S. Appl. No. 13/016,928, Decision on Pre-Appeal Brief Request mailed Oct. 25, 2014", 2 pgs.
"U.S. Appl. No. 13/016,928, Examiner Interview Summary mailed Jan. 4, 2013", 3 pgs.
"U.S. Appl. No. 13/016,928, Examiner Interview Summary mailed Jan. 22, 2014", 3 pgs.
"U.S. Appl. No. 13/016,928, Examiner Interview Summary mailed May 13, 2014", 3 pgs.
"U.S. Appl. No. 13/016,928, Final Office Action mailed Feb. 5, 2014", 13 pgs.
"U.S. Appl. No. 13/016,928, Final Office Action mailed Dec. 20, 2012", 10 pgs.
"U.S. Appl. No. 13/016,928, Non Final Office Action mailed Jul. 27, 2012", 10 pgs.
"U.S. Appl. No. 13/016,928, Non Final Office Action mailed Oct. 15, 2013", 12 pgs.
"U.S. Appl. No. 13/016,928, Pre-Appeal Brief Request filed Jun. 5, 2014", 5 pgs.
"U.S. Appl. No. 13/016,928, Response filed Jan. 15, 2014 to Non Final Office Action mailed Oct. 15, 2013", 11 pgs.
"U.S. Appl. No. 13/016,928, Response filed Mar. 20, 2013 to Final Office Action mailed Dec. 20, 2012", 11 pgs.
"U.S. Appl. No. 13/016,928, Response filed Oct. 29, 2012 to Non Final Office Action mailed Jul. 27, 2012", 10 pgs.

\* cited by examiner

SMART TRANSITIONS

TECHNICAL FIELD

The disclosure generally relates to video editing.

BACKGROUND

Video editing applications allow a user to create, manipulate and aggregate video clips to generate user customized videos. Vendors of video editing applications seek to make the video editing process easy for the user while allowing the user to create videos that are enjoyable to watch.

SUMMARY

A method, system and computer-readable storage medium for performing smart transitions between video clips are disclosed. According to implementations, a first video clip can be displayed on an interface of a video editing application. A second video clip can be received in the interface. In response to receiving the second video clip, a video clip sequence that includes the first video clip, the second video clip and a transition selected based on content characteristics of the first video clip and the second video clip can be generated. The generated video clip sequence containing the transition can be displayed on the interface. The video clip sequence including the transition can be generated automatically in response to receiving the second video clip.

According to some implementations, the video clip sequence can be generated by selecting a transition type for the transition based on content characteristics of the first video clip and the second video clip. The video clip sequence can be generated by comparing content characteristics of the first video clip to content characteristics of the second video clip and selecting the transition type based on the comparison. The transition type can be a fade-in, a fade-out, a hard-cut, a dissolve, a crossfade or a wipe. The content characteristics can include color characteristics, motion characteristics, temporal characteristics, or a combination thereof.

According to implementations, the video clip sequence can be generated by analyzing metadata for the first video clip and the second video clip to determine content characteristics for the first video clip and the second video clip, respectively. The video clip sequence can be generated by comparing content characteristics of a first end-portion of the first video clip to content characteristics of a second end-portion of the second video clip. The content characteristics of the first video clip and second video clip can be determined based on sideband data associated with the first video clip and the second video clip, respectively.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Smart Transitions

Figure 1:
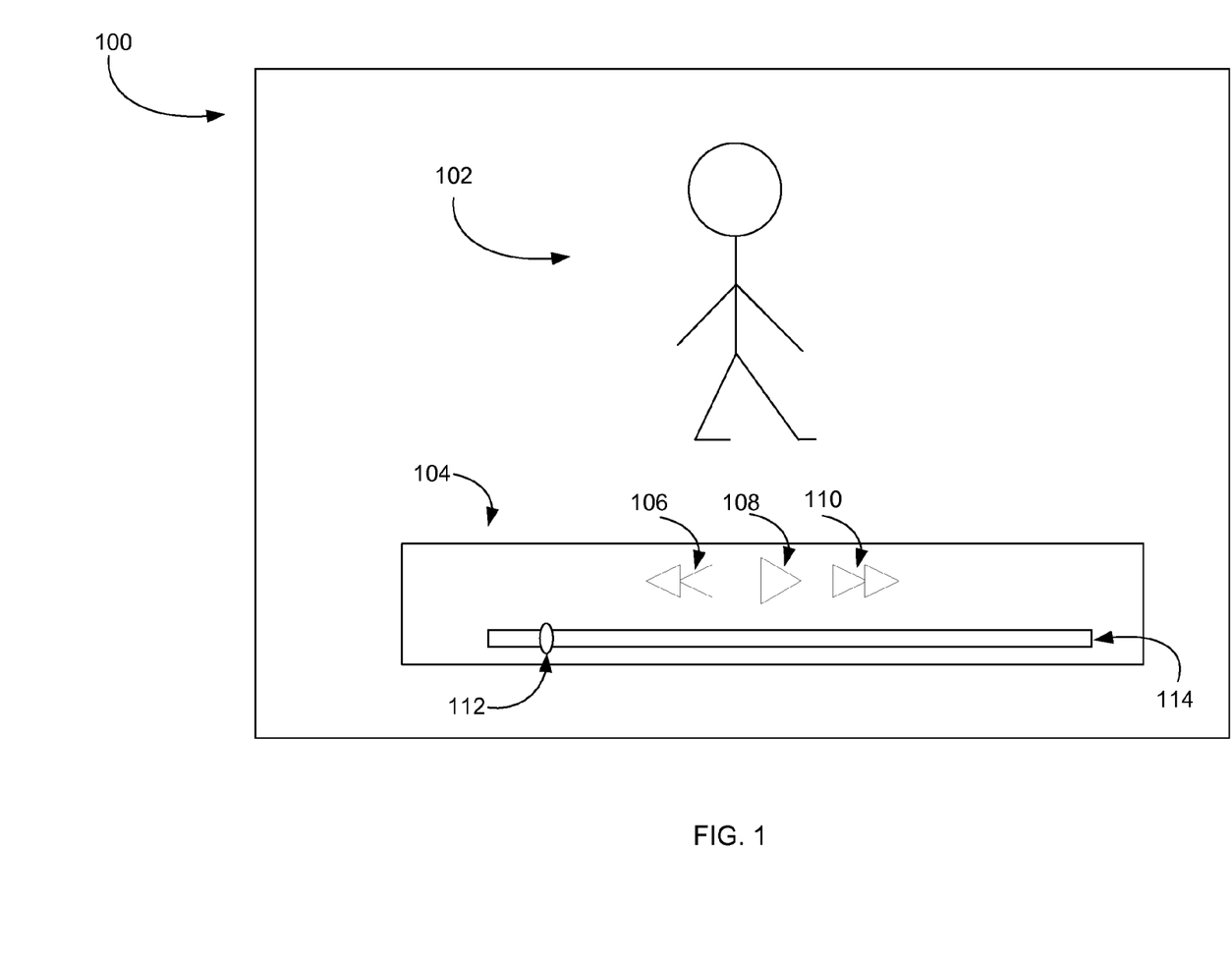
FIG. 1 illustrates an exemplary video playback interface.

FIG. 1 illustrates an exemplary playback interface for a video editing application. The video playback user interface includes display environment 100. For example, display environment 100 may be an application window displayed on a display of a computing device. The display environment may be configured to display an image 102. For example, image 102 may be a video image corresponding to one of a plurality of successive frames of a video (or video clip) or a still image such as a digital photograph. Control element 104 includes user interface elements 106, 108 and 110 for controlling the display of video. For example, element 106 allows a user to rewind (move the video back in time) a video, element 108 allows a user to play a video, and element 110 allows a user to fast forward a video. Control element 104 may also include timeline 114 to indicate to a user the duration of a video, how much of the video has been played, or how much of the video remains to be played. Timeline 114 may include position indicator 112 to indicate to a user the current position in the timeline during playback of a video. The video playback interface may also provide a user interface element (not shown) for entering an edit mode of the video editing application. For example, a user may enter an edit mode of the video editing application by selecting a menu item from a pull-down menu or by selecting a user interface element displayed in display environment 100 or displayed on control element 104. A user may enter an edit mode of the video editing application by performing an editing action, such as pasting or dragging and dropping a video into display environment 100.

Figure 2:
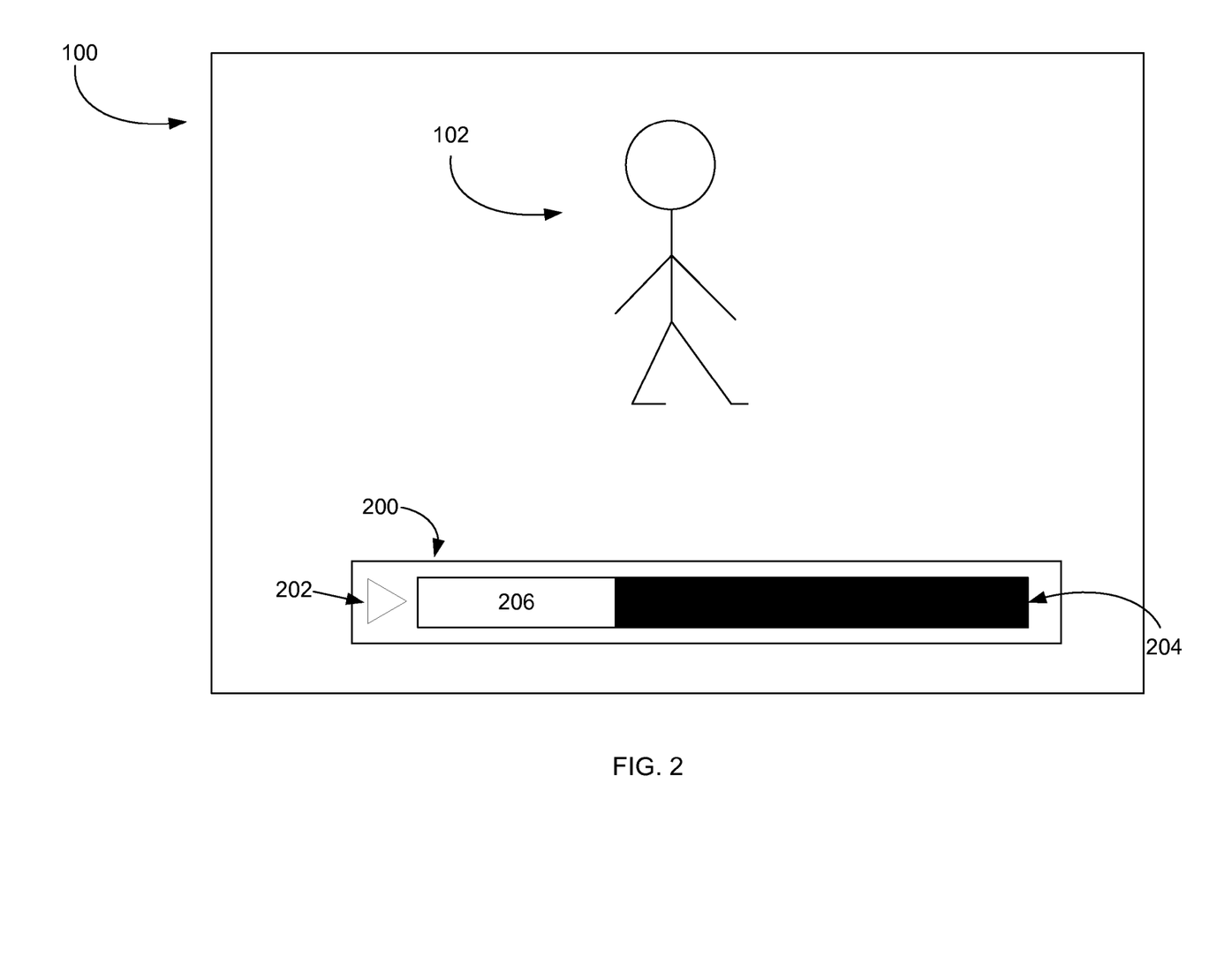
FIGS. 2-4 illustrate exemplary video editing interfaces.
Figure 3:
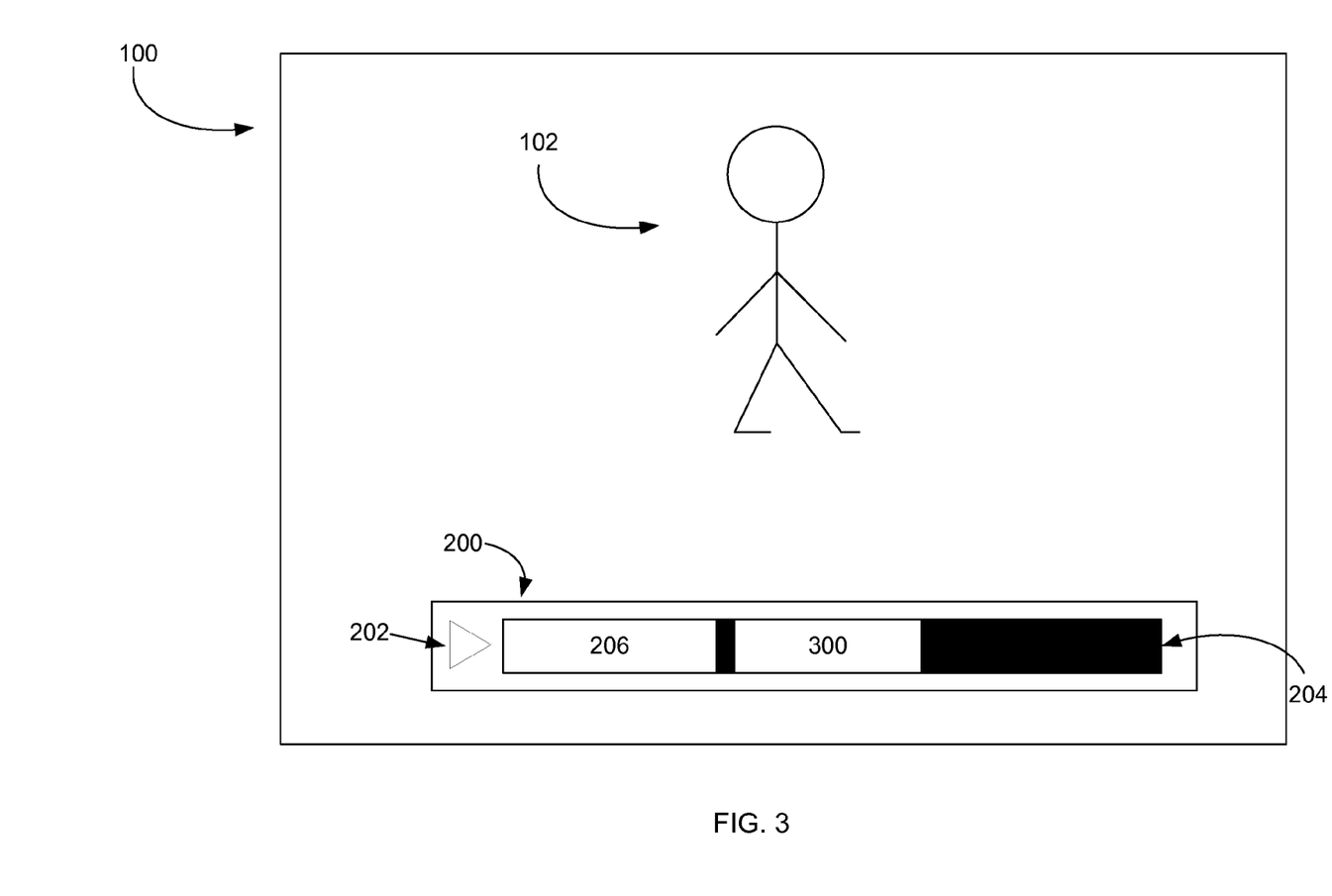
Figure 4:
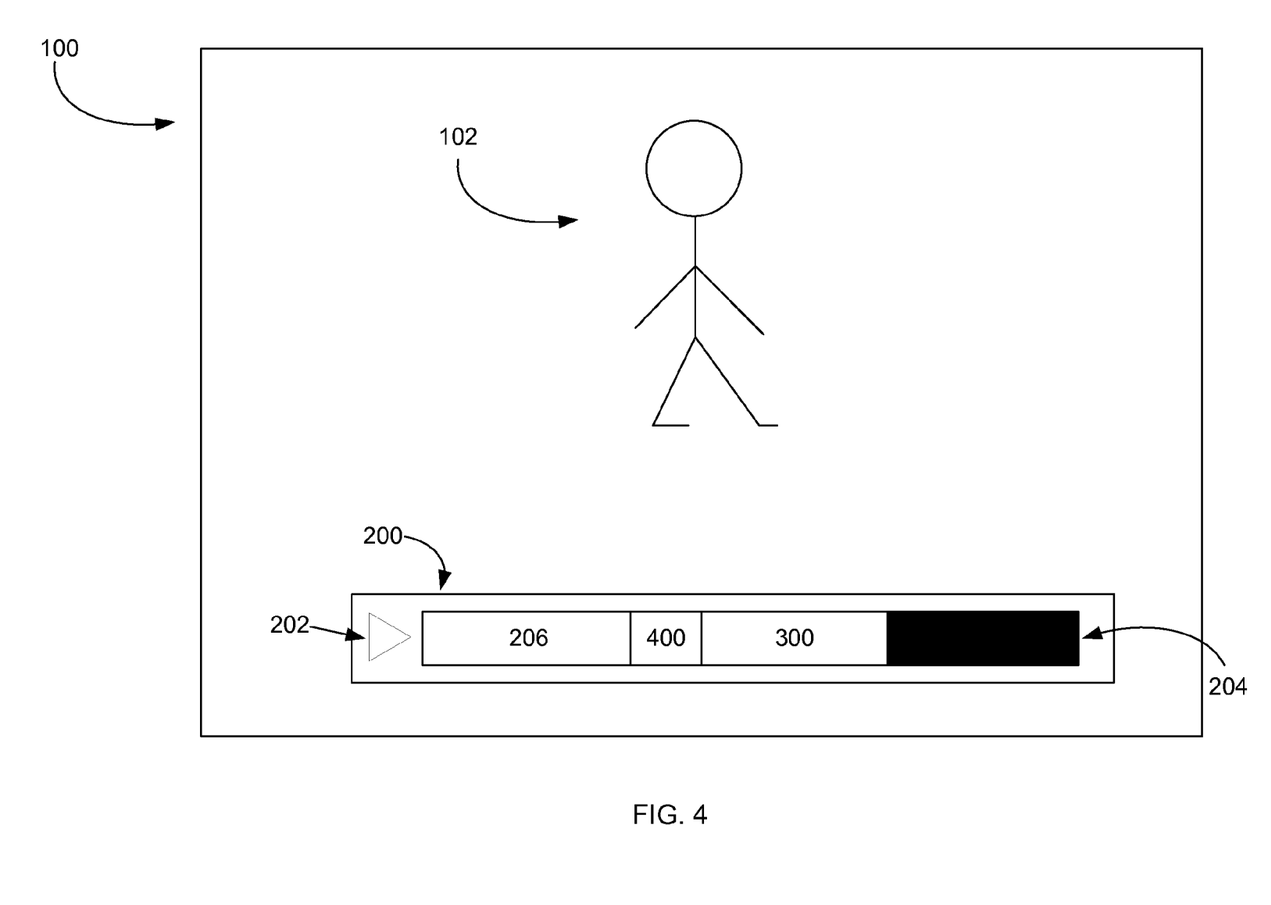

FIGS. 2-4 illustrate exemplary editing interfaces for a video editing application that performs smart transitions. Referring to FIG. 2, display environment 100 may include control element 200. For example, control element 200 may be displayed when the video editing application is in an edit mode. Control element 200 may be a semi-transparent overlay control element that allows a user to see the displayed image 102 through the control element 200. Control element 200 may include user interface element 202 that allows a user to play a video and a timeline 204 that displays images representing portions of a video or video clip. For example, timeline 204 may display images representing video clip 206. Timeline 204 may include zero, one, or a plurality of video clips and may display images representing each video clip in timeline 204.

According to implementations, the video editing application may be configured so that video clip 206 may be added to timeline 204 by performing a drag and drop operation on video clip 206. For example, video clip 206 outside of display environment 100 (e.g., external to the video editing application) may be selected and dragged into display environment 100. If video clip 206 is dropped into display environment 100, video clip 206 may be added to timeline 204. If the video editing application is in playback mode, dropping video clip 206 into display environment 100 may cause the video editing application to enter video editing mode.

According to implementations, video clip sequences may be manipulated using timeline 204. For example, video clip 206 may be selected by a user, dragged to a location in timeline 204, and dropped at the location into a sequence of video clips displayed in timeline 204. If no video clips exist in timeline 204, video clip 206 is added to timeline 204. Video clips already in timeline 204 may be rearranged or removed through drag and drop operations. For example, a user may select video clip 206 in timeline 204 and drag it to a different location in timeline 204 to modify the sequence of video clips. To remove video clip 206 from timeline 204, the user may select video clip 206 and delete it via input to keyboard (e.g., delete key or backspace key) or user interface element (e.g., delete menu item on a pull-down menu). Rearranging video clips in timeline 204 may cause the video editing application to perform smart transitions, as described in detail below.

Referring to FIG. 3, timeline 204 may include video clip 206 and video clip 300. For example, video clip 300 may be added to timeline 204 by pasting video clip 300 into display environment 100. Video clip 300 may be added to timeline 204 by dragging and dropping video clip 300 into display environment 100 or by dragging and dropping video clip 300 directly into timeline 204. If video clip 300 is dropped into display environment 100, video clip 300 may be added to the end of timeline 204. For example, video clip 300 may be appended to other videos already in timeline 204, if any. If video clip 300 is dropped into timeline 204, video clip 300 may be added to timeline 204 at the position where video clip 300 was dropped into timeline 204. For example, video clip 300 may be inserted at the beginning, middle or end of timeline 204 based on where video clip 300 was dropped into timeline 204.

Referring to FIG. 4, timeline 204 may include video clip 206, video clip 300 and transition 400 for transitioning between video clip 206 and video clip 300. For example, when video clip 300 is dropped into video environment 100 or timeline 204, transition 400 may be automatically selected and placed between video clip 206 and video clip 300 in timeline 204 thereby generating a video sequence that contains video clip 206, transition 400 and video clip 300. If video clip 300 is added to timeline 204 after video clip 206, transition 400 may be selected based on an ending portion of video clip 206 and a beginning portion of video clip 300. If video clip 300 is added to timeline 204 before video clip 206, transition 400 may be selected based on an ending portion of video clip 300 and a beginning portion of video clip 206. If video clip 300 is added between two videos in the timeline, transitions may be selected for transitioning between video clip 300 and each of the videos adjacent to video clip 300 in timeline 204 based on the respective adjoining beginning and ending portions of the video clips. When the video sequence is played, transition 400 may provide a visually appealing transition between video clip 206 and video clip 300. For example, smart transitions may provide a video editing application where the default transitional behavior is the correct transitional behavior for transitioning between adjoining videos. The correct default transitional behavior may be selected automatically and without user input once a video is added to the video editing application.

Figure 5:
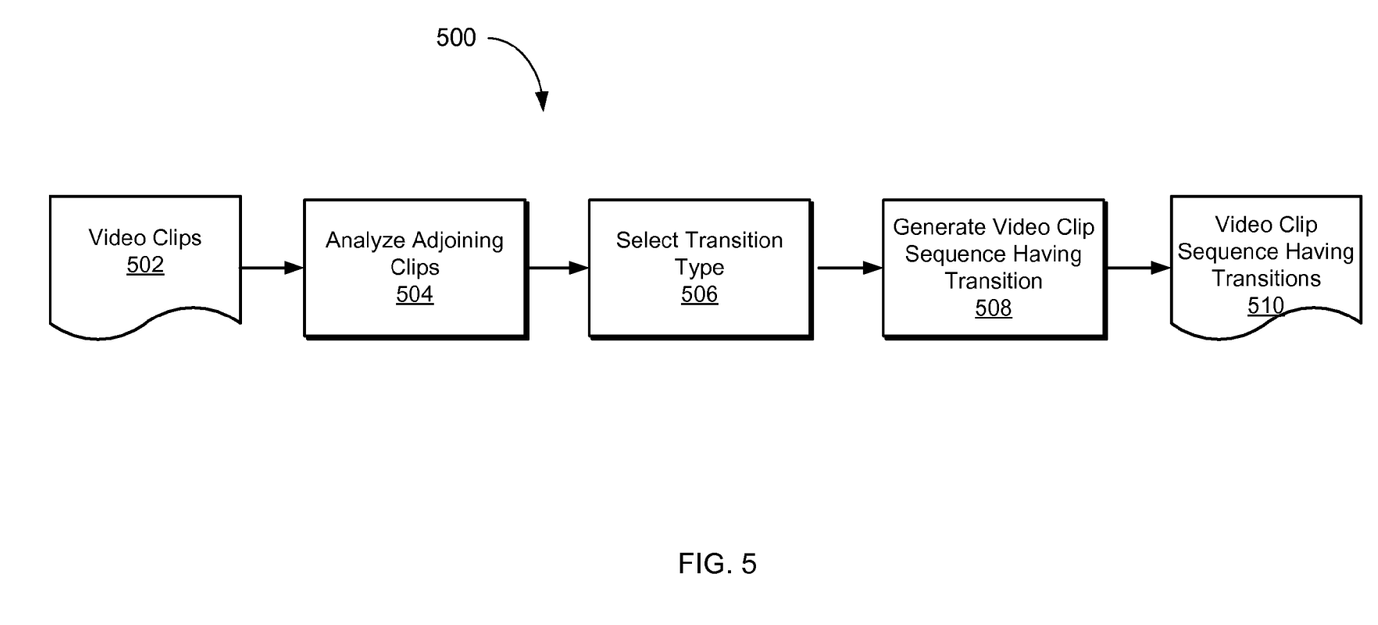
FIG. 5 is a block diagram of an exemplary system for performing smart transitions.

FIG. 5 is a block diagram of an exemplary system for performing smart transitions. The system of FIG. 5 may automatically analyze adjoining videos, select a transition type for transitioning between the adjoining videos and generate a video clip sequence having the adjoining videos and the selected transition type.

In block 504, adjoining video clips in video clips 502 are analyzed. For example, the analysis of video clips 502 may include performing image analysis on frames of video clips 502, comparing image data from video clips 502, or comparing metadata associated with video clips 502. For example, video clips 502 may include video clip 206 and video clip 300 in FIG. 4. When video clips 502 are received in block 504, video clips 206 and 300 may be compared. For example, upon receiving video clip 300 in a video editing application that already has video clip 206, the temporal characteristics of video clip 300 and video clip 206 may be compared. Video clip 300 and video clip 206 may be analyzed to determine content characteristics of the video clips or portions of the video clips. For example, an end portion (last sequence of frames) of video clip 206 and a beginning portion (first sequence of frames) of video clip 300 may be analyzed to determine the color characteristics and/or motion characteristics of the end portion and beginning portion.

Content characteristics may include temporal characteristics (e.g., based on a date or time that the content was captured), motion characteristics (e.g., the amount of motion in the content), color characteristics, or a combination thereof. The system may determine content characteristics of adjoining video clips based on video image analysis or analysis of video sideband data. For example, upon receiving a video clip, the video editing application may analyze the video clip, or portions of the video clip, to determine the content characteristics of the video clip, or portion thereof. Video content may be analyzed to identify motion vectors that indicate the amount of motion in a video. The video content may be analyzed using known techniques to determine the color characteristics of the video content. Sideband data associated with each of the adjoining videos may be analyzed to determine motion, color and temporal characteristics encoded in the sideband data.

In block 506, a transition type is selected. For example, a transition type may be selected based on the content characteristics determined for adjoining video clips or adjoining portions of video clips. For example, if it is determined that the content of adjoining video clips is temporally proximate (i.e., was captured on the same day), a hard-cut transition may be selected for transitioning between the adjoining video clips. If it is determined that the content of the video clips is temporally distant (i.e., was captured on different days), a crossfade transition may be selected for transitioning between the adjoining video clips. If it is determined that the content of the adjoining video clips contains a high amount of motion, a hard-cut may be selected for transitioning between the adjoining video clips. If it is determined that the content of the adjoining video clips contains a low amount of motion, a crossfade transition may be selected. Moreover, if it determined that the color characteristics of two adjoining video clips are similar, a hard-cut transition may be selected; if the color characteristics are different, a crossfade transition may be selected.

A transition type may be selected based on a hierarchy of content characteristics of adjoining video clips. For example, a transition type selection made based on color characteristics of adjoining video clips may override a transition type selection based on temporal characteristics of adjoining video clips. A transition type selection made based on motion characteristics of adjoining video clips may override a selection made based on color characteristics and/or temporal characteristics of adjoining video clips. Thus, if adjoining video clips have high motion characteristics (hard-cut) but are temporally distant (crossfade) and have dissimilar color characteristics (crossfade) a hard-cut transition type may be selected.

The specific transition types associated with specific content characteristics disclosed above is merely an example of possible configurations. Other transition types may be used. For example, a fade-in, fade-out, dissolve, or a wipe may be used to transition between videos having various content characteristics. The transition type associated with a particular combination of content characteristics may be configurable. For example, instead of selecting a hard-cut for transitioning between two video clips having high motion characteristics, the video editing application may be configured to select a wipe transition for transitioning between two high motion video clips. The video editing application may be configured to receive user input that changes the default transition types associated with content characteristics.

In block 508, a video clip sequence having a selected transition type is generated. For example, once a transition type is selected based on the content characteristics of the two adjoining videos, video clip sequence 510 may be generated having the selected transition type between the adjoining videos. When a user plays back the generated video clip sequence, the video editing application will play back the first clip, followed by the selected transition, followed by the second clip. For example, the video editing application may play back video clip 206, followed by transition 400, followed by video clip 300, as illustrated by FIG. 4. The generated video clip sequence including the transition may be generated as a single video; for example, a single video file containing the video clips and selected transitions may be generated and stored. The generated video clip sequence may be generated as metadata that describes locations of the video clips and transitions that make up the video clip sequences and the order in which the video clips and transitions should be played or displayed in video display environment 100. For example, video clips and transitions may be stored as individual files and the video editing application may use the metadata to play the videos and transitions according to the sequence generated in block 508.

Figure 6:
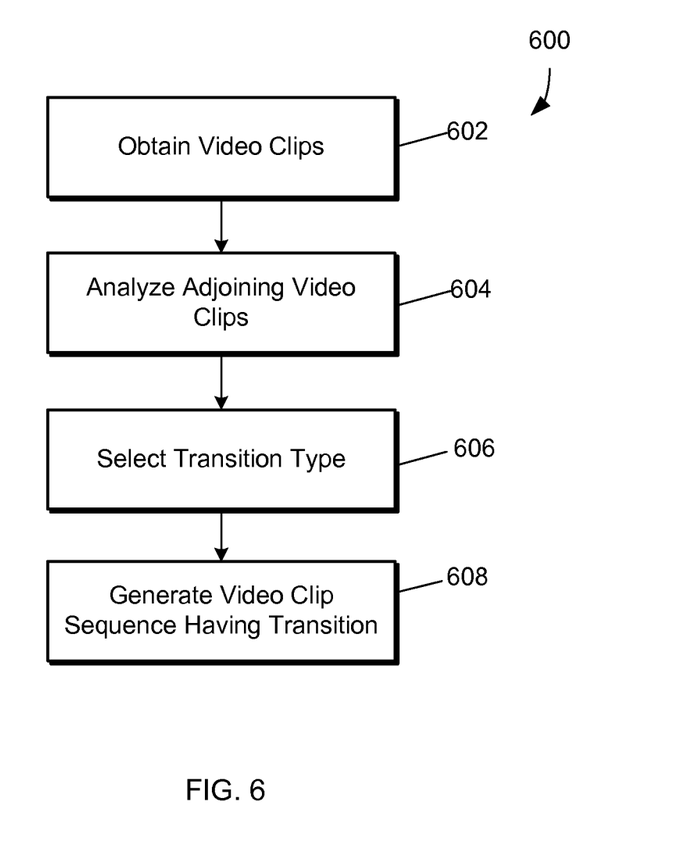
FIG. 6 is a flow diagram of an exemplary process for performing smart transitions.

FIG. 6 is a flow diagram of an exemplary process 600 for performing smart transitions. At step 602, video clips are obtained. For example, a video editing application may obtain a first video clip followed by a second video clip. The video clips may be obtained via a video editing application interface, as disclosed above. For example, the video clips may be dragged and dropped into video display environment 100 or timeline 204 as discussed above with reference to FIGS. 2-5.

At step 604, the video clips obtained at step 602 may be analyzed. For example, the content characteristics of adjoining video clips, or adjoining portions of video clips, obtained at step 602 may be analyzed and/or compared to determine the color characteristics, motion characteristics, and/or temporal characteristics of the adjoining video clips or video clip portions, as disclosed above.

At step 606, a transition type is selected. For example, based on the analysis and/or comparison of adjoining video clips, or adjoining portions of video clips, a transition type may be selected. The transition type may be selected based on rules defined for particular content characteristics, such as motion characteristics, temporal characteristics, or color characteristics, or a combination of content characteristics, as disclosed above with reference to FIG. 5.

At step 608, a video clip sequence having the selected transition type is generated. For example, the video clip sequence may be generated as a single video file or as metadata that describes how to play the video clips and transitions in the generated sequence. The metadata may describe the locations of video clips and transitions and the order in which the video clips and transitions in the video clip sequence should be played. Generating the video clip sequence is described in detail above with reference to FIG. 5.

According to some implementations, transitions in a sequence of video clips may be adjusted based on an analysis of a video clip sequence as a whole, including transitions. For example, transition types for transitioning between video clips may be automatically selected according to the techniques described above with reference to FIGS. 1-6. Several video clips may be added to a video clip sequence and several transitions may be automatically selected for transitioning between the video clips in the sequence. In some implementations, transitions types may be changed or adjusted based on an analysis of an entire video clip sequence, including video clips and transitions. For example, the video clip sequence may be analyzed to determine if a particular transition type is used too frequently (e.g., more than a specified number of times, or more than specified ratio of a particular type of transition to all transitions as a whole) and, if the particular transition type is used too frequently, the transitions in the video clip sequence may be changed to generate more variation in the transition types. Transition types in a video clip sequence may be adjusted or changed based on the overall color composition and/or the overall amount of motion in the video clip sequence, for example.

Transition types in a video clip sequence may be adjusted or changed based on the length (duration) of the video clip sequence. For example, if a video clip sequence is of short duration (less than a specified period of time), the video clip sequence may be adjusted to start and end with a hard-cut transition. If a video clip sequence is of long duration (greater than a specified period of time), the video clip sequence may be adjusted to fade in at the beginning of the video clip sequence and fade out at the end of the video clip sequence, for example. Thus, as video clips are added to the short video clip sequence and the video clip sequence becomes a long video clip sequence, the beginning and ending transitions may be adjusted or changed from hard-cut transitions to fade in/fade out transitions, for example. Thus, according to implementations, a transition type for transitioning between adjacent video clips may be automatically selected based data associated with the adjacent video clips, data associated other video clips in the video clip sequence, and/or other transitions in the video clip sequence.

Implementations disclosed above may provide a video editing application that allows a user to create a custom video from many different video clips. A video editing application that includes the features disclosed above may automatically insert transitions of an appropriate type between adjoining video clips such that the default transition (e.g., automatically selected transition) is a visually correct transition for transitioning between adjoining video clips.

Defect Replacement Using Smart Transitions

Figure 7:
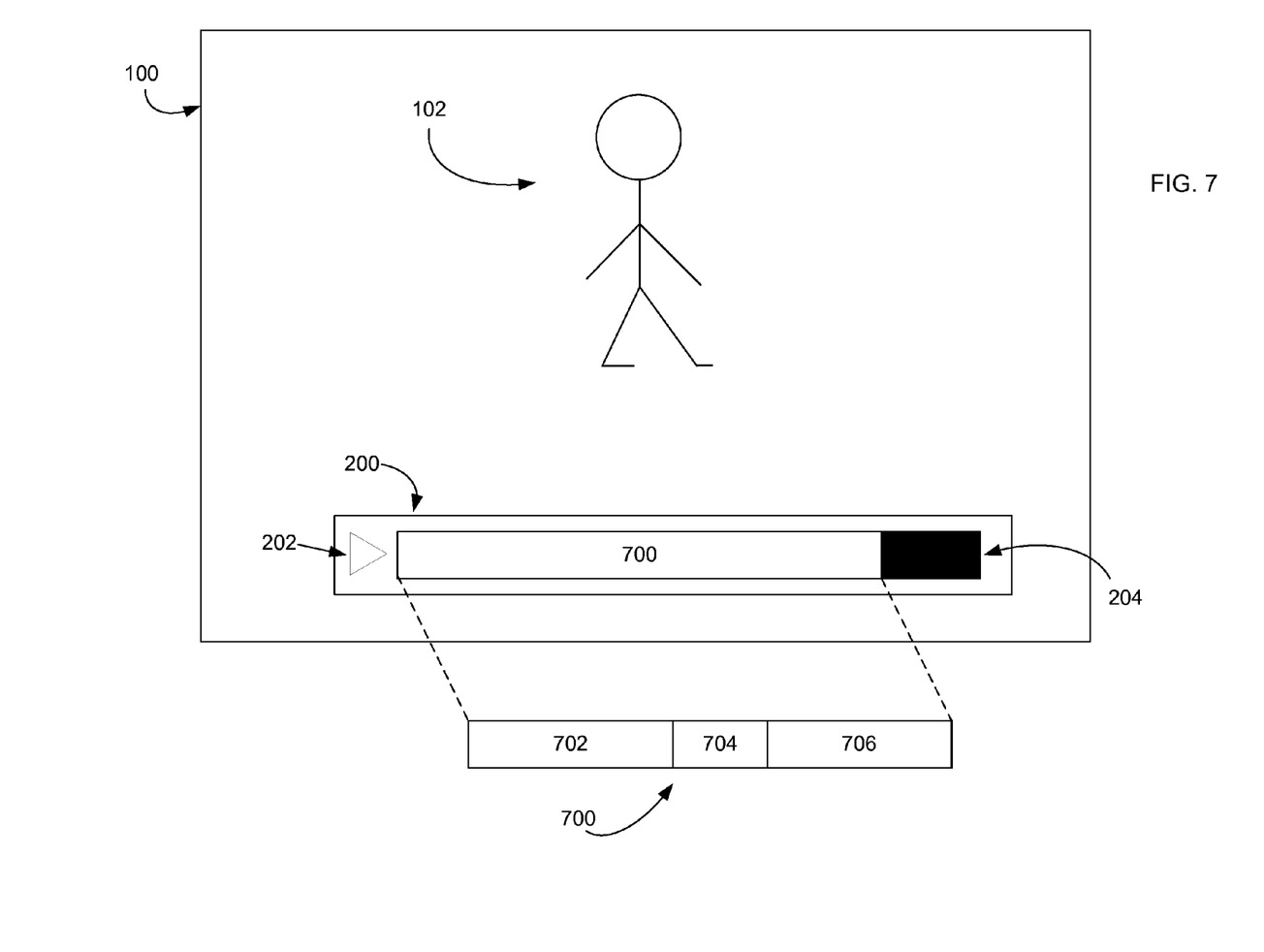
FIG. 7 illustrates an exemplary video editing interface and a video having a defective portion and a non-defective portion.

FIG. 7 illustrates an exemplary editing interface for a video editing application that performs defect replacement using smart transitions. For example, display environment 100 may include control element 200. Control element 200 may include interface element 202 that allows a user to playback video clip 700 in timeline 204. Video clip 700 may be inserted into timeline 204 by dragging and dropping video clip 700 into display environment 100 or directly into timeline 204. Video clip 700 may be added to timeline 204 using a paste operation (e.g., a user may copy and paste the video into display environment 100). Other types of insert or add operations may be used to add/insert video clip 700 into timeline 204.

Upon adding or inserting video clip 700 into timeline 204, video clip 700 may be analyzed to determine whether video clip 700 includes any defective portions that should be replaced by a video transition. For example, video clip 700 may include non-defective portions 702 and 706 and defective portion 704. Each portion (702, 704 and 706) of video clip 700 may include one or more frames of video. For example, each frame of video clip 700 may be analyzed to identify defective portion 704 and non-defective portions 702 and 706. Sideband data and/or metadata associated with clip 700 may be analyzed to identify defects in clip 700. For example, sideband data may be analyzed for motion data that might indicate rotation of captured clip content. Defective portion 704 may include one or more frames of video that display defects that make the video difficult to view or watch. For example, defects may include a rotation of the image (e.g., the capture device was rotated by the user while capturing the video, the video image rotates from a landscape layout to a portrait layout), a blurring of the image (e.g., capture device was out of focus), and over-exposure or under-exposure of the image. Known image analysis techniques may be applied to each frame of clip 700 in order to detect rotation, blur, over-exposure and/or under-exposure of the image in the frame and identify the defective portion 704 (and non-defective portions 702 and 706) of clip 700.

Figure 8:
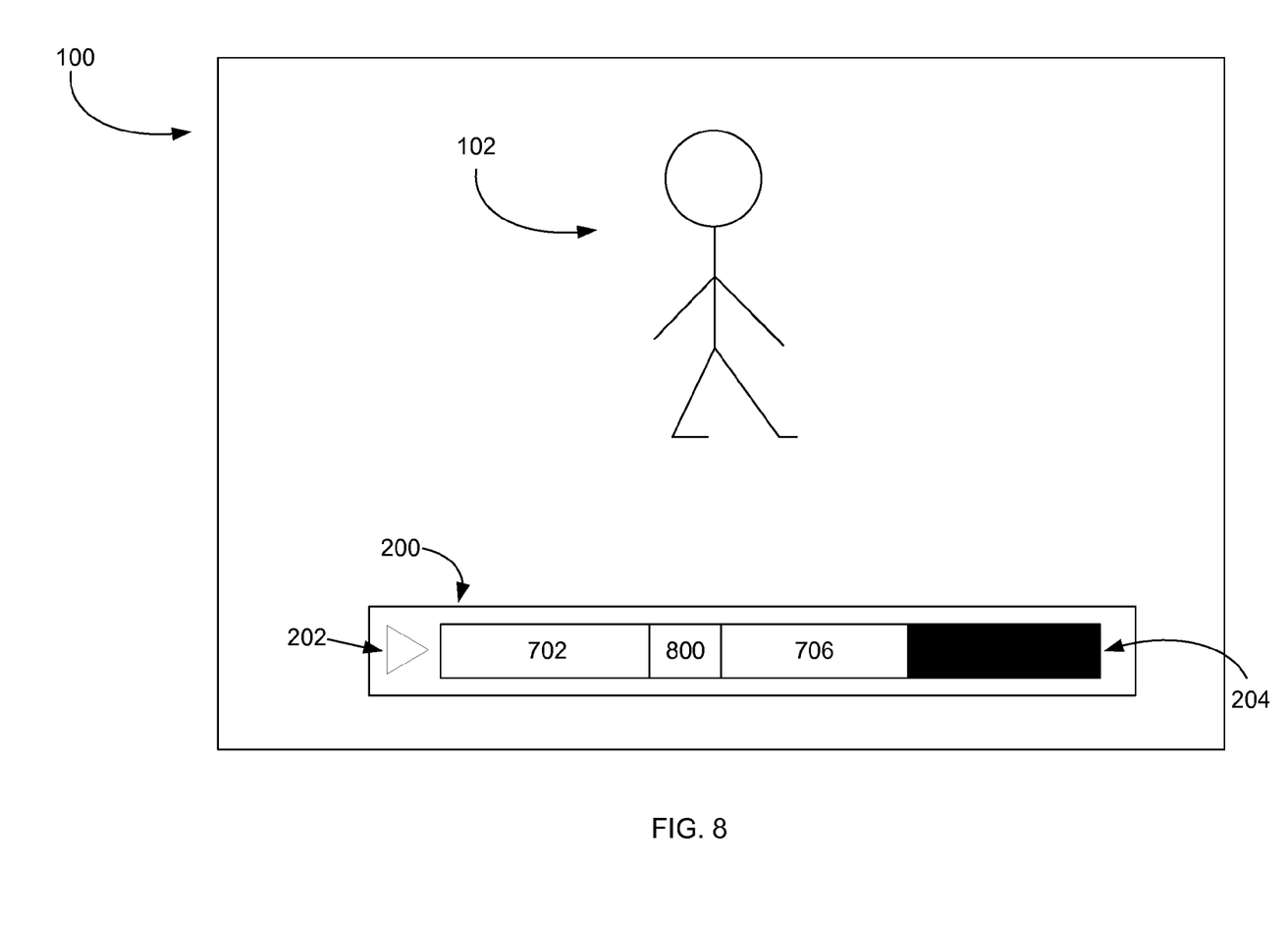
FIG. 8 illustrates an exemplary video editing interface.

FIG. 8 illustrates an exemplary editing interface for a video editing application that performs defect replacement using smart transitions. Timeline 204 may include non-defective portions 702 and 706 of clip 700 and transition 800. For example, defective portion 704 (FIG. 8) of clip 700 may be removed from clip 700 thereby generating two video clips (video clips 702 and 706) corresponding to non-defective portions 702 and 706 of clip 700. Video clips 702 and 706, or adjoining portions of video clips 702 and 706, may be analyzed and/or compared to determine an appropriate transition type for transitioning between video clip 702 and 706. The transition type may be determined, or selected, based on content characteristics of video clips 702 and 706 as detailed above with reference to FIGS. 1-6. Once the appropriate transition type is selected, a transition 800 of the selected type may be inserted between video clip 702 and video clip 706 to generate a video clip sequence that contains transition 800 between video clip 702 and video clip 706. Selection of an appropriate transition type may provide a viewer of the video a visually pleasing transition from video clip 702 to video clip 706.

Figure 9:
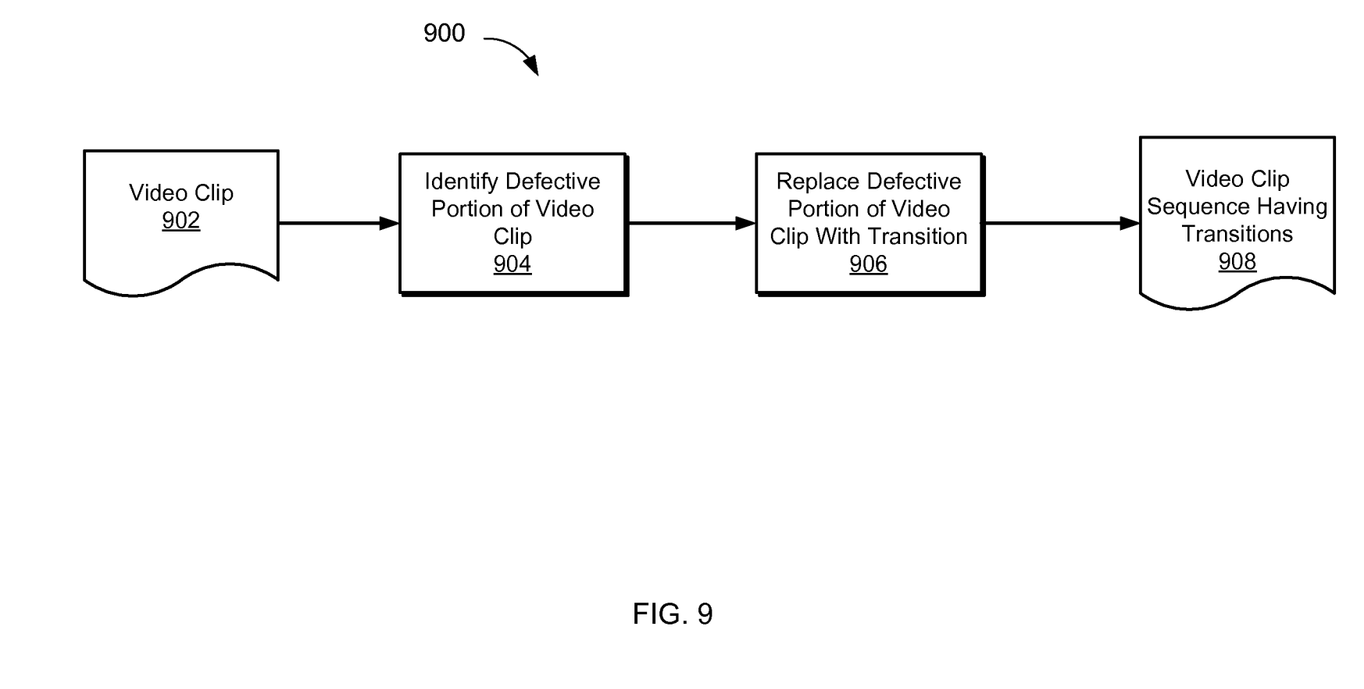
FIG. 9 is a block diagram of an exemplary system for performing defect replacement using smart transitions.

FIG. 9 is a block diagram of an exemplary system for performing defect replacement and smart transitions. In block 904 of process 900, video clip 902 may be analyzed to determine whether video clip 902 contains a defect. If video clip 902 is determined to have a defect, a defective portion of the video clip having the defect is identified. The defective portion may contain one or more frames that contain defective content.

In block 906, the defective portion of video clip 902 is replaced with a video transition. For example, a defect in video clip 902 may make it difficult for a viewer to watch video clip 902 or provide a displeasing transition from one portion of video clip 902 to another portion of video clip 902. For example, rotating the video capture device (i.e., camera), not properly focusing the video capture device, over-exposing or under-exposing the video image may make it difficult to enjoy watching video clip 902. These defects in video clip 902 may be identified, removed, and replaced with a video transition that makes the video more enjoyable to watch. By replacing defective portions of video clip 902 with transitions, as disclosed above, video clip sequence 908 may be generated.

Figure 10:
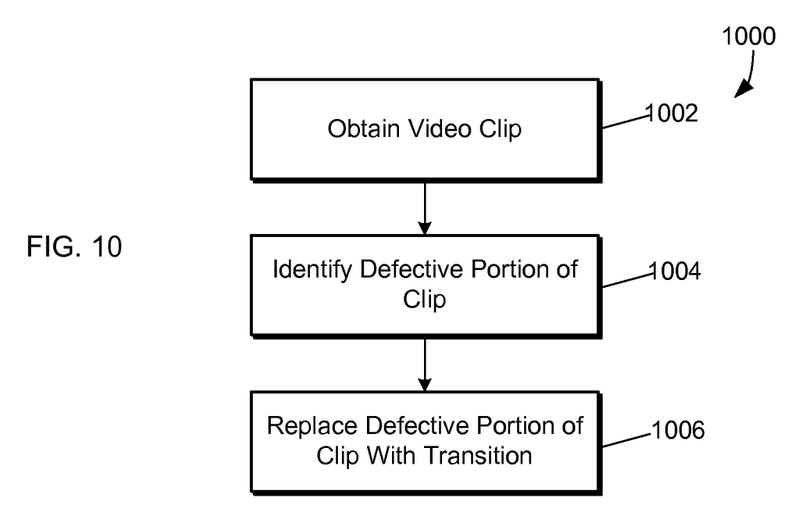
FIG. 10 is a flow diagram of an exemplary process for performing defect replacement using smart transitions.

FIG. 10 is a flow diagram of an exemplary process for performing defect replacement and smart transitions. For example, upon obtaining a video clip, the video clip may be analyzed to identify defective portions of the video clip. Once identified, the defective portions may be replaced with video transitions according to the implementations disclosed with reference to FIGS. 1-6, above. The process of identifying defects in the video clip and replacing the defective portions of the video clip with transitions may be done automatically (without user input) upon obtaining the video clip.

At step 1002 of process 1000, a video clip is obtained. For example, a user may use a cursor to drag and drop a video clip into display environment 100 of a video editing application. Alternatively, a user may open a video clip using various menu items, user interface elements (buttons, overlays, etc.), or shortcut keys or clicks as provided by the video editing application.

At step 1004, a defective portion of the video clip is identified. For example, once the video is dropped into (or opened in) the video editing application, the video editing application may automatically identify defective portions of the video clip. A defective portion of a video clip may be identified by performing image analysis to detect rotation in the video image, blur in the video image, over-exposure of the video image, or under-exposure of the video image, as discussed above with reference to FIG. 7 and FIG. 9.

At step 1006, the defective portion of the video clip is replaced with a video transition. For example, the identified defective portion of the video clip may be removed thereby generating two or more non-defective video clips from the remaining portions of the video. The non-defective video clips may be analyzed and a video transition type may be selected based on the results of the analysis, as disclosed in detail above with reference to FIGS. 1-6. Once the video transition type is selected, a video transition of the selected type may be inserted between the non-defective video clips to provide a clean transition between the non-defective video clips when played. Thus, defective portions of a video clip may be replaced by video transitions by identifying and removing the defective portions of the video clip and inserting video clip transitions between remaining non-defective portions of the original video clip.

Implementations disclosed above may provide a video editing application that automatically removes defects from video clips and replaces the defective portions of the video clips with a video transition. The defect and removal process may include automatically selecting and inserting video transitions of an appropriate type between non-defective portions of the video clips such that the default transition (e.g., automatically selected transition) is a visually correct transition for transitioning between adjoining non-defective video clips.

Exemplary System Architecture

Figure 11:
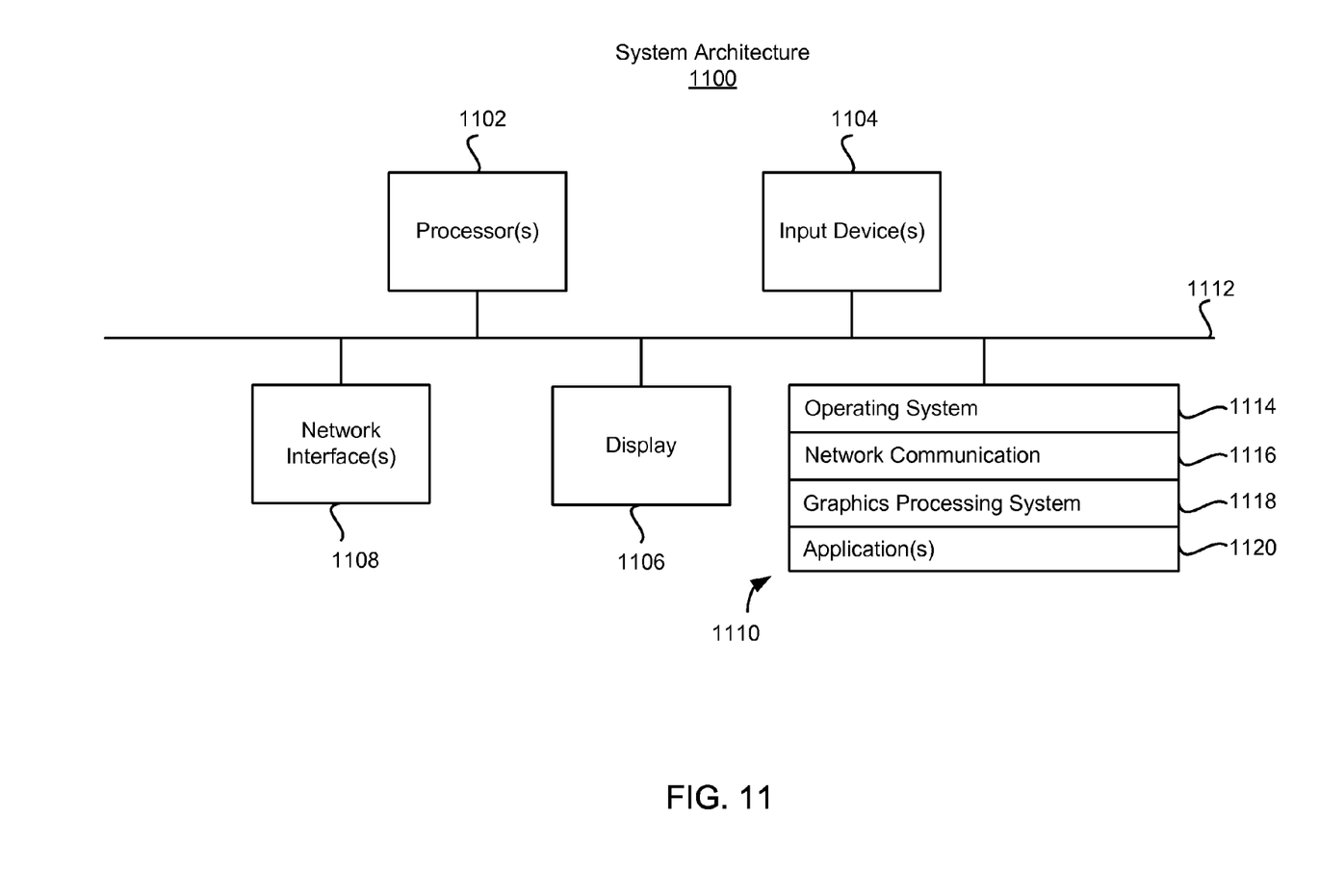
FIG. 11 is a block diagram of an exemplary system architecture implementing the features and processes of FIGS. 1-10.

FIG. 11 is a block diagram of an exemplary system architecture implementing the features and processes of FIGS. 1-10. The architecture 1100 can be implemented on any electronic device that runs software applications derived from compiled instructions, including without limitation personal computers, servers, smart phones, media players, electronic tablets, game consoles, email devices, etc. In some implementations, the architecture 800 can include one or more processors 1102, one or more input devices 1104, one or more display devices 1106, one or more network interfaces 1108 and one or more computer-readable mediums 1110. Each of these components can be coupled by bus 1112.

Display device 1106 can be any known display technology, including but not limited to display devices using Liquid Crystal Display (LCD) or Light Emitting Diode (LED) technology. Processor(s) 1102 can use any known processor technology, including but are not limited to graphics processors and multi-core processors. Input device 1104 can be any known input device technology, including but not limited to a keyboard (including a virtual keyboard), mouse, track ball, and touch-sensitive pad or display. Bus 1112 can be any known internal or external bus technology, including but not limited to ISA, EISA, PCI, PCI Express, NuBus, USB, Serial ATA or FireWire. Computer-readable medium 1110 can be any medium that participates in providing instructions to processor(s) 1102 for execution, including without limitation, non-volatile storage media (e.g., optical disks, magnetic disks, flash drives, etc.) or volatile media (e.g., SDRAM, ROM, etc.).

Computer-readable medium 1110 can include various instructions 1114 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 1104; sending output to display device 1106; keeping track of files and directories on computer-readable medium 1110; controlling peripheral devices (e.g., disk drives, printers, etc.) which can be controlled directly or through an I/O controller; and managing traffic on bus 1112. Network communications instructions 1116 can establish and maintain network connections (e.g., software for implementing communication protocols, such as TCP/IP, HTTP, Ethernet, etc.).

A graphics processing system 1118 can include instructions that provide graphics and image processing capabilities. For example, the graphics processing system 1118 can implement the processes, as described with reference to FIGS. 1-10.

Application(s) 1120 can be an image processing application or any other application that uses the processes described in reference to FIGS. 1-10, such as a photo or video editor. The processes can also be implemented in operating system 1114.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
receiving selections of a plurality of video clips through a video editing interface;
responsive to receiving the selections, selecting one of a plurality of transition types to insert between consecutive pairs of the plurality of video clips, each selected transition type selected from a preselected plurality of transition types based on content characteristics of the corresponding consecutive pair of video clips;
in response to selecting the transition types, generating a video clip sequence that includes the plurality of video clips and each selected transition inserted between the corresponding consecutive pair of video clips;
selecting a particular transition inserted between the corresponding consecutive pair of video clips based upon an analysis of the entire video clip sequence;
replacing the particular transition in the video clip sequence with a different transition, the different transition of a type selected from one of the plurality of transition types that is a different transition type than a transition type of the particular transition; and
displaying the video clip sequence on the video editing interface.

2. The method of claim 1, comprising:
analyzing one of the plurality of video clips to determine whether the video clip includes any defective portions;
determining that the video clip includes a first defective portion, the first defective portion occurring in the video clip after a first non-defective portion and before a second non-defective portion;
responsive to determining that the video clip includes the first defective portion, removing the first defective portion from the video clip and automatically inserting into the video clip, an additional transition, the additional transition of a type selected from a second preselected plurality of transition types, the transition type selected based upon content characteristics of the first non-defective portion and the second non-defective portion.

3. The method of claim 2, wherein
defective portions include portions that exhibit one or more of: rotation, image blurring, over-exposure, and under-exposure.

4. The method of claim 1, wherein the preselected plurality of transition types includes at least one of a fade-in, a fade-out, a hard-cut, a dissolve, a crossfade and a wipe.

5. The method of claim 1, wherein content characteristics include color characteristics, motion characteristics, temporal characteristics, or a combination thereof.

6. The method of claim 1, wherein selecting transition types comprises:
analyzing metadata of consecutive pairs of video clips to determine content characteristics for each of the video clips, respectively.

7. The method of claim 1, wherein selecting transition types comprises:
comparing content characteristics of a first end-portion of a first of a pair of consecutive video clips to content characteristics of a beginning portion of a second of the pair of consecutive video clips.

8. The method of claim 1, further comprising determining content characteristics of the video clips based on sideband data associated with the video clips.

9. The method of claim 1, wherein selecting the particular transition inserted between the corresponding consecutive pair of video clips based upon an analysis of the entire video clip sequence comprises analyzing the entire video clip sequence to determine if a particular one of the plurality of transition types was used too frequently.

10. A system comprising:
one or more computer processors; and
a non-transitory memory which stores instructions, which when executed by the one or more computer processors, cause the one or more computer processors to perform the operations comprising:
receiving selections of a plurality of video clips through a video editing interface;
responsive to receiving the selections, selecting one of a plurality of transition types to insert between consecutive pairs of the plurality of video clips, each selected transition type selected from a preselected plurality of transition types based on content characteristics of the corresponding consecutive pair of video clips;
in response to selecting the transition types, generating a video clip sequence that includes the plurality of video clips and each selected transition inserted between the corresponding consecutive pair of video clips;
selecting a particular transition inserted between the corresponding consecutive pair of video clips based upon an analysis of the entire video clip sequence;
replacing the particular transition in the video clip sequence with a different transition, the different transition of a type selected from one of the plurality of transition types that is a different transition type than a transition type of the particular transition; and
causing the video clip sequence to be displayed on the video editing interface.

11. The system of claim 10, wherein the instructions include instructions, which, when executed by the one or more computer processors, causes the one or more computer processors to perform the operations comprising:
analyzing the one of the plurality of video clips to determine whether the video clip includes any defective portions;
determining that the video clip includes a first defective portion, the first defective portion occurring in the video clip after a first non-defective portion and before a second non-defective portion;
responsive to determining that the video clip includes the first defective portion, removing the first defective portion from the first video clip and automatically inserting into the video clip, an additional transition, the additional transition of a type selected from a second preselected plurality of transition types, the transition type selected based upon content characteristics of the first non-defective portion and the second non-defective portion.

12. The system of claim 10, wherein defective portions include portions that exhibit one or more of: rotation, image blurring, over-exposure, and under-exposure.

13. The system of claim 10, wherein the preselected plurality of transition types includes at least one of a fade-in, a fade-out, a hard-cut, a dissolve, a crossfade and a wipe.

14. The system of claim 10, wherein content characteristics include color characteristics, motion characteristics, temporal characteristics, or a combination thereof.

15. The system of claim 10, wherein the instructions for selecting transition types comprise instructions, which when performed by the one or more computer processors, cause the one or more computer processors to perform the operations comprising:

analyzing metadata of consecutive pairs of video clips to determine content characteristics for each of the consecutive pairs of video clips, respectively.

16. The system of claim 10, wherein the instructions for selecting transition types comprise instructions, which when performed by the one or more computer processors, cause the one or more computer processors to perform the operations comprising:

comparing content characteristics of a first end-portion of a first video clip of a consecutive pair of video clips to content characteristics of a beginning portion of a second video clip of a consecutive pair of video clips.

17. The system of claim 10, wherein generating the video clip sequence is performed automatically in response to receiving the last of the plurality of video clips.

18. The system of claim 10, wherein the content characteristics of the video clips are determined based on sideband data associated with the video clips.

19. The system of claim 10, wherein the operations for selecting the particular transition inserted between the corresponding consecutive pair of video clips based upon an analysis of the entire video clip sequence comprises analyzing the entire video clip sequence to determine if a particular one of the plurality of transition types was used too frequently.

20. A non-transitory computer-readable medium that stores instructions which, when executed by one or more computer processors, causes the one or more computer processors to perform operations comprising:

receiving selections of a plurality of video clips through a video editing interface;

responsive to receiving the selections, selecting one of a plurality of transition types to insert between consecutive pairs of video clips, each selected transition type selected from a preselected plurality of transition types based on content characteristics of the corresponding consecutive pair of video clips;

in response to selecting the transition types, generating a video clip sequence that includes the plurality of video clips and each selected transition inserted between the corresponding consecutive pair of video clips;

selecting a particular transition inserted between the corresponding consecutive pair of video clips based upon an analysis of the entire video clip sequence;

replacing the particular transition in the video clip sequence with a different transition, the different transition of a type selected from one of the plurality of transition types that is a different transition type than a transition type of the particular transition; and displaying the video clip sequence on the video editing interface.

21. The non-transitory computer-readable medium of claim 20, wherein the instructions include instructions, which when performed by the one or more processors, cause the one or more processors to perform operations comprising:

analyzing one of the plurality of video clips to determine whether the video clip includes any defective portions;

determining that the video clip includes a first defective portion, the first defective portion occurring in the video clip after a first non-defective portion and before a second non-defective portion;

responsive to determining that the video clip includes the first defective portion, removing the first defective portion from the video clip and automatically inserting into the first video clip, an additional transition, the additional transition of a type selected from a second preselected plurality of transition types, the transition type selected based upon content characteristics of the first non-defective portion and the second non-defective portion.

22. The non-transitory computer-readable medium of claim 20, wherein defective portions include portions that exhibit one or more of: rotation, image blurring, over-exposure, and under-exposure.

23. The non-transitory computer-readable medium of claim 20, wherein the preselected plurality of transition types includes at least one of: a fade-in, a fade-out, a hard-cut, a dissolve, a crossfade or a wipe.

24. The non-transitory computer-readable medium of claim 20, wherein content characteristics include color characteristics, motion characteristics, temporal characteristics, or a combination thereof.

25. The non-transitory computer-readable medium of claim 20, wherein the instructions for selecting a transition type comprise instructions, which when performed by the one or more computer processors, cause the one or more computer processors to perform the operations comprising:

analyzing metadata of a first of a pair of consecutive video clips and a second of the pair of consecutive video clips to determine content characteristics for the first video clip and the second video clip, respectively.

26. The non-transitory computer-readable medium of claim 20, wherein the instructions for selecting a transition type comprise instructions, which when performed by the one or more computer processors, cause the one or more computer processors to perform the operations comprising:

comparing content characteristics of a first end-portion of a first of a pair of consecutive video clips to content characteristics of a beginning portion of a second of the pair of consecutive video clips.

27. The non-transitory computer-readable medium of claim 20, wherein generating the video clip sequence is performed automatically in response to receiving the last of the plurality of video clips.

28. The non-transitory computer-readable medium of claim 20, wherein the content characteristics of the video clips are determined based on sideband data associated with the video clips.

29. The non-transitory computer-readable medium of claim 20, wherein the operations for selecting the particular transition inserted between the corresponding consecutive pair of video clips based upon an analysis of the entire video clip sequence comprises analyzing the entire video clip sequence to determine if a particular one of the plurality of transition types was used too frequently.

\* \* \* \* \*